P. PATTERSON, DEC'D.
SAFE DEPOSIT & TRUST CO. OF PGH., EXECUTOR.
APPARATUS FOR THE MANUFACTURE OF TUBING.
APPLICATION FILED SEPT. 15, 1911.

1,114,799.

Patented Oct. 27, 1914.

2 SHEETS—SHEET 1.

WITNESSES.

INVENTOR.

P. PATTERSON, DEC'D,
SAFE DEPOSIT & TRUST CO. OF PGH., EXECUTOR.
APPARATUS FOR THE MANUFACTURE OF TUBING.
APPLICATION FILED SEPT. 15, 1911.
1,114,799.
Patented Oct. 27, 1914.
2 SHEETS—SHEET 2.
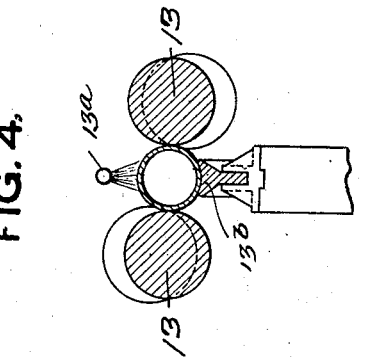
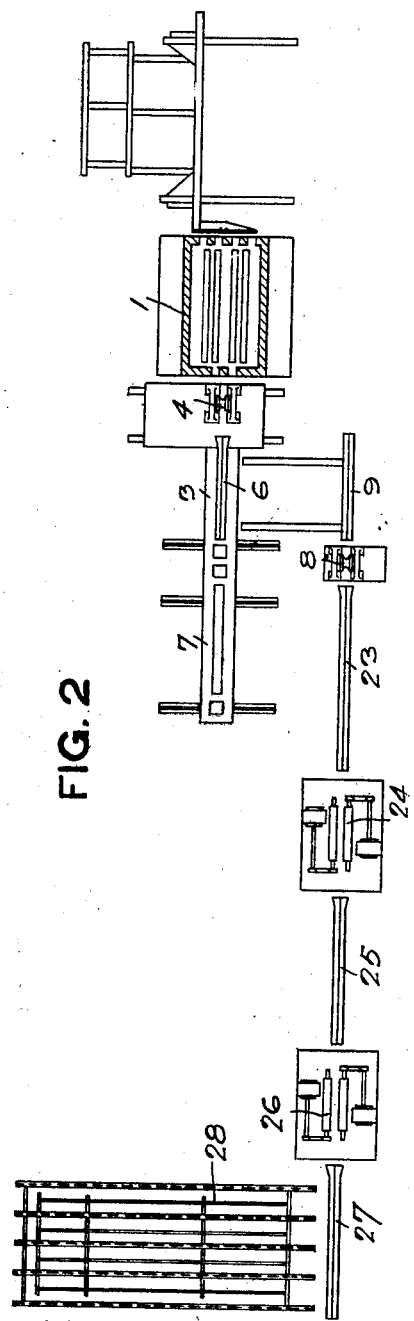
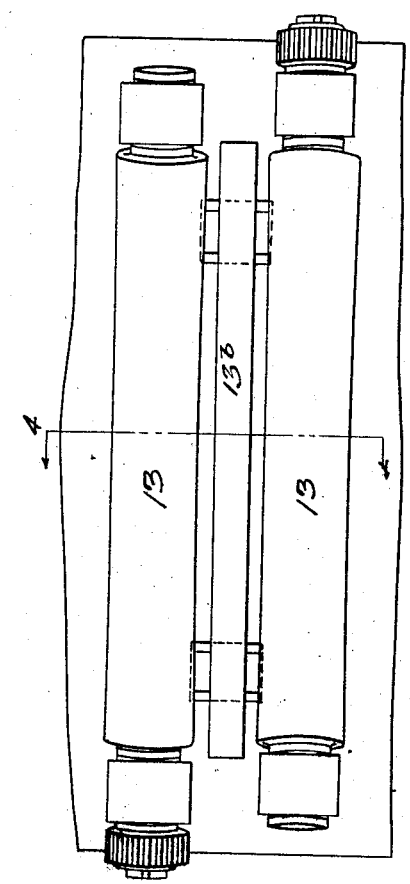
WITNESSES.
INVENTOR.

UNITED STATES PATENT OFFICE.

PETER PATTERSON, OF PITTSBURGH, PENNSYLVANIA; SAFE DEPOSIT & TRUST CO. OF PGH. EXECUTOR OF SAID PATTERSON, DECEASED.

APPARATUS FOR THE MANUFACTURE OF TUBING.

1,114,799.  Specification of Letters Patent.  Patented Oct. 27, 1914.

Application filed September 15, 1911. Serial No. 649,461.

*To all whom it may concern:*

Be it known that I, PETER PATTERSON, a citizen of the United States, and resident of Pittsburgh, in the county of Allegheny and State of Pennsylvania, have invented a new and useful Improvement in Apparatus for the Manufacture of Tubing; and I do hereby declare the following to be a full, clear, and exact description thereof.

My invention relates to apparatus for the manufacture of tubing.

In a companion application filed of even date herewith, Serial No. 649,465, I have described the method of manufacture adapted to be employed with the present apparatus, and in a companion application filed of even date herewith, Serial No. 649,460, I have described the general apparatus for the practice of said method including the apparatus of the present application. In said applications I have described the manufacture of tubing in which a single welding furnace is employed with a welding machine operating therewith, the pipe being delivered to a trough leading to sizing rolls and thence to multiple finishing rolls, and being, as set forth in said application, adapted to obtain a prolonged cross-roll finishing so that the pipe when finished are brought to a sufficiently low temperature to be set and not liable to sag out of shape during the further cooling on the cooling table, and the scale being more perfectly removed from the welded pipe which, in such finishing operation, are brought to a temperature below scaling heat so that in connection with such finishing operation and in the further cooling of the pipe a permanent protective surface oxid may be formed thereon.

The present application relates to modified arrangements of the finishing rolls and it comprises, generally stated, the combination with the welding furnace and welding machine, of cross-roll finishing machines set in tandem so that the pipe are subjected to successive finishing operations and thereby brought to true cylindrical form and the finishing is continued long enough to set the pipe before it is delivered to the cooling table, bringing it to so low temperature that it will not bend or warp thereon.

Figure 1:
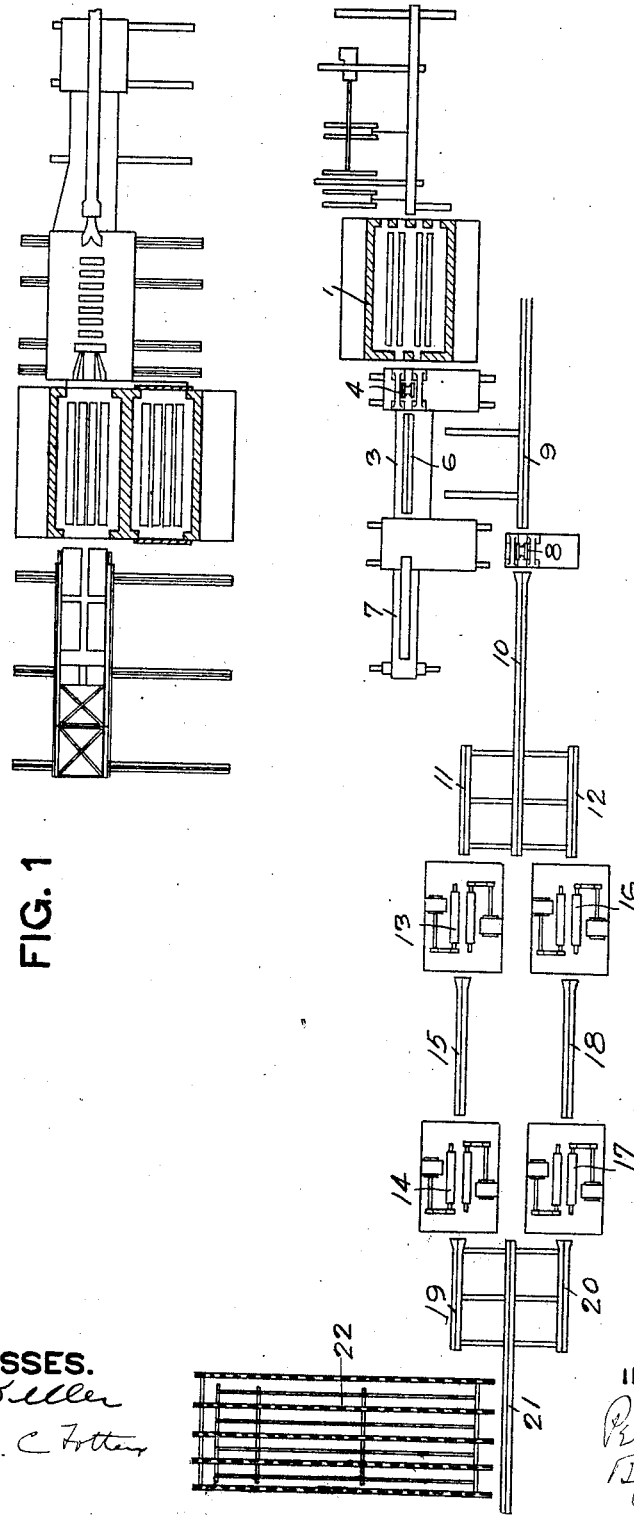
Figure 1:
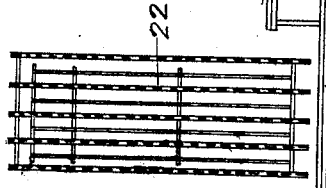

In the accompanying drawings Figure 1 is a diagrammatic view of a plant embodying my invention, together with the apparatus for heating, scarfing and bending the skelp; Fig. 2 is a like view of a modification of the same; Fig. 3 is an enlarged plan view of the finishing rolls; and Fig. 4 is a cross section thereof.

The welding furnace 1 is of the ordinary or any suitable construction, and is provided with a pusher for pushing the skelp from the same into the welding machine 3, which is illustrated as traveling laterally at the back of the welding furnace, that furnace being shown with two discharging ports through which the pipe is pushed into the welding rolls 4. The welding machine has the receiving trough 6 and back of the same, the bar puller 7, and at the side of the welding machine is the sizing machine 8 with its feeding trough 9 and delivery trough 10, the sizing machine being formed of two concave rolls power driven. In the preferred arrangement of the apparatus as illustrated in Fig. 1 the trough 10 extends out toward the finishing machines and on each side of the same are the feeding troughs 11 and 12 leading to said machines. In line with the feeding trough 11 are the cross rolls 13 and 14 connected by the trough 15, and in line with the feeding trough 12 are the cross rolls 16 and 17 connected by the trough 18. Beyond the finishing rolls 14 and 17, respectively, are the receiving troughs 19 and 20, and between said troughs is the delivery trough 21 which leads to the cooling table 22. I prefer to provide the cross roll finishing machines with rolls of as great length as practicable, for example, for large pipe as long as eighteen feet, and they are made to feed the tube through the same at a slow speed, practically about one-half the speed commonly employed. For example, the travel of the pipe through the finishing machines as commonly employed is about 5½ inches per revolution of the rolls, that speed being necessary to take care of the production of the welding furnaces, when only a single set of finishing rolls is employed. The finishing rolls as preferably employed in the apparatus of my invention are preferably operated to give a longitudinal feed of the pipe of about two to three inches per revolution of the rolls, this being accomplished by the angular position or set of the rolls and by the concavity given thereto.

In the use of the above apparatus, the skelp are fed into the welding furnaces and raised to proper welding heat therein, and then fed to the welding rolls and welded into tubing. The mandrel bar is then withdrawn by the bar puller and the pipe is rolled over laterally into the cooling trough 9 of the sizing machine, and the welded pipe passed through the sizing rolls thereof into the trough 10 and alternate pipes are fed into the troughs 11, 12, the pipe passing from the trough 11 first through the finishing rolls 13, being delivered onto the trough 15 and then through the finishing rolls 14 of that pair of tandem sets of finishing rolls, being finally delivered to the trough 19 and then laterally onto the cooling table. The next pipe is delivered into the trough 12 and thence from the finishing rolls 17 into the trough 20 and then into the trough 21 and onto the cooling table. The racks between the trough 10 and the troughs 11 and 12 provide storage in case of delay in finishing.

In the use of the apparatus the pipe can follow each other in this course rapidly so that the pipes may be subjected to the finishing operation in all four sets of rolls at the same time, and may thus be subjected to the prolonged cross roll finishing at a slow forward feed under water cooling as by means of a spray pipe 13ª, so that when the pipes are delivered from either tandem set of finishing rolls they are brought to such low heat that they are set and not liable to sag and lose shape in the further cooling thereof on the cooling table. In such cooling operation the pipe are carried continually over the pipe supports of the sets of finishing rolls arranged in tandem, for example the support 13ᵇ as shown in Fig. 4, thus scraping off the scale from the pipe, forming a smooth, and in fact largely polished, surface thereon free from scale. In this treatment the pipe are brought down to a temperature below the ordinary scaling heat, indeed, to a temperature in the neighborhood of or below 1000° Fah., and the exposure of the smooth surface formed on the pipe under the water cooling and the exposure to the atmosphere leads to the formation of a permanent oxid coating on the pipe which protects the same from rapid corrosion. When so operating I provide practically the same conditions as are present in the manufacture of polished sheet iron, the slow finishing leading to the scraping and removal from the bodies of the pipe of the scale formed by the high heat of the welding furnace, and absorbing the heat from the pipe in such way that when it leaves the finishing rolls it is at the proper temperature for the formation of such permanent oxid coating which is gradually formed thereon in the further cooling on the cooling table. As the cross roll finishing is continued until after the pipe are perfectly round and straight and below the temperature at which they would warp in further cooling, it is evident that practically all the pipe will be delivered from the cooling table in true cylindrical shape so that the rounding up of the ends of the pipe in the threading machine is rendered unnecessary and a much greater output can therefore be obtained from these machines, while the difficulty of crystallizing action due to a cold rounding up process is done away with. The net output of the furnace is also increased because the necessity for re-heating and re-rolling the pipe which have sagged out of shape subsequent to the finishing operation is overcome.

The plant illustrated in Fig. 1 is more particularly adapted for the formation of smaller pipe where a large number of pipe are produced. The plant illustrated in Fig. 2 is adapted for the formation of larger pipe, where as the number welded in the furnace is not as large the necessary slow roll finishing can be obtained in a single set embodying two tandem finishing machines. The same parts are illustrated by the same reference numerals, and the trough 23 leading from the sizing rolls is in line with the first cross-roll finishing machine 24. Beyond and in line with said set is the trough 25 and beyond and in line with said trough is the cross-roll finishing machine 26 leading to the trough 27 and to the cooling table 28. In the operation of this apparatus though the tandem sets of cross rolls must of course be driven at a speed proper to take care of the output from the furnace, yet by the employment of tandem sets of cross rolls, the necessary cooling within the cross rolls to lower the temperature of the pipe to that at which it is set and not liable to sag, and the advantages above referred to are obtained.

What I claim is:

1. In apparatus for the manufacture of tubing, the combination of a welding furnace, welding rolls coöperating therewith, a sizing machine adapted to receive the tube from the welding rolls, a trough leading therefrom and a plurality of cross roll finishing machines set in tandem relation and adapted to receive the tube from said trough and operate successively thereon.

2. In apparatus for the manufacture of tubing, the combination of a welding furnace, welding rolls coöperating therewith, and multiple sets of cross roll finishing machines said machines of each set being arranged in tandem relation, and feeding connections from the welding rolls to said finishing machines adapted to feed the tubes to said sets successively.

3. In apparatus for the manufacture of tubing, the combination of a welding furnace, welding rolls coöperating therewith, a trough at the side of the welding rolls, a sizing machine and a receiving trough beyond it, feeding troughs on each side of said receiving trough adapted to receive the welded tubes therefrom alternately, and two sets of cross roll finishing machines the machines of each set being arranged in tandem relation and in line with each of said feeding troughs.

In testimony whereof, I the said PETER PATTERSON have hereunto set my hand.

PETER PATTERSON.

Witnesses:
ROBERT C. TOTTEN,
JOHN F. WILL.